(No Model.)

W. A. TURNER.
FLUSHING VALVE.

No. 477,716. Patented June 28, 1892.

Witnesses
F. A. Cutter
Rufus B. Fowler

Inventor
William A. Turner

United States Patent Office.

WILLIAM A. TURNER, OF WORCESTER, MASSACHUSETTS, ASSIGNOR TO EDMUND CONVERSE, OF SAME PLACE.

FLUSHING-VALVE.

SPECIFICATION forming part of Letters Patent No. 477,716, dated June 28, 1892.

Application filed November 15, 1889. Serial No. 330,485. (No model.)

*To all whom it may concern:*

Be it known that I, WILLIAM A. TURNER, a citizen of the United States, and a resident of Worcester, in the county of Worcester and State of Massachusetts, have invented a new and useful Improvement in Flushing-Valves, of which the following is a specification, reference being had to the accompanying drawings, in which—

Figure 1:
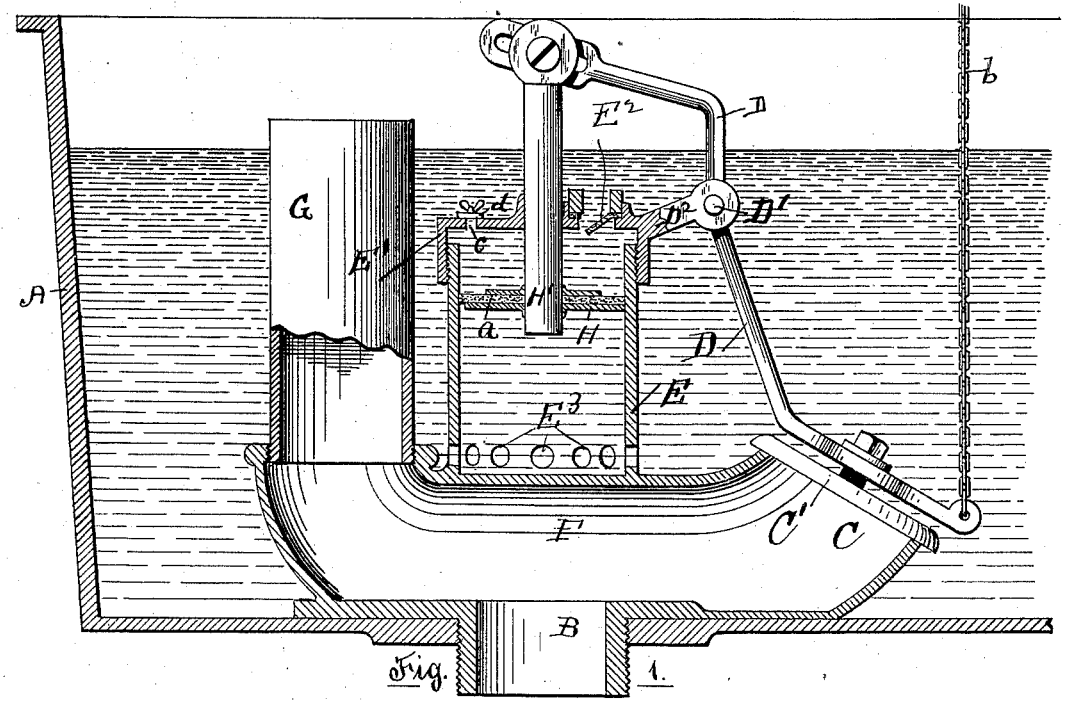
Figure 2:
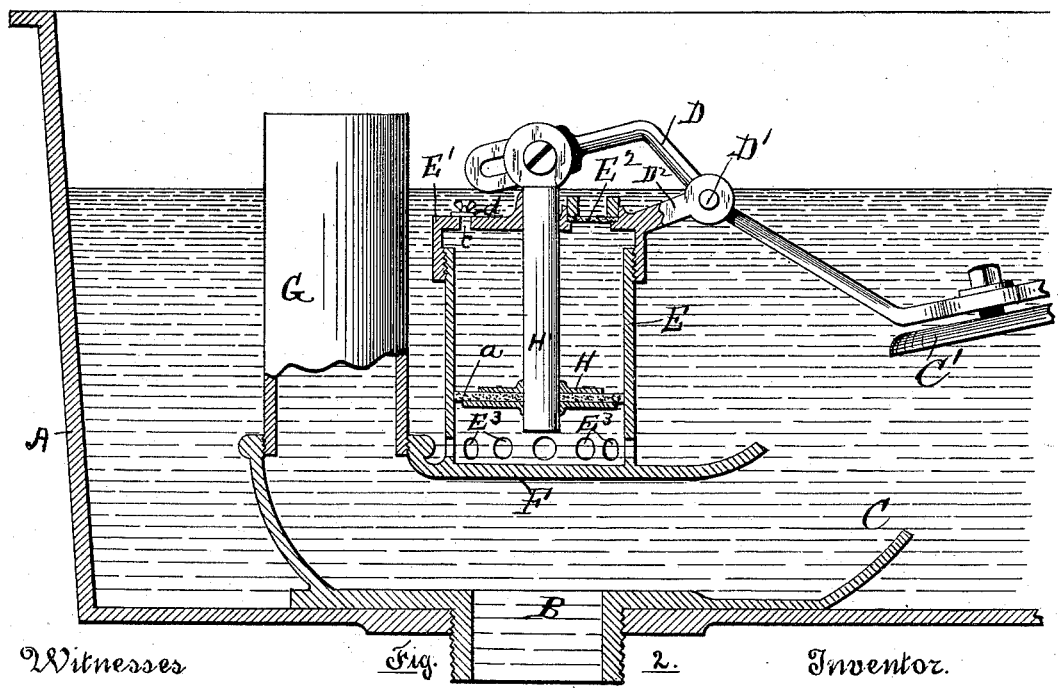

Figure 1 represents a sectional view of a portion of a flushing tank or cistern containing one of my improved flushing-valves, also shown in sectional view, the valve proper being represented as closed; and Fig. 2 represents the same view shown in Fig. 1, but with the valve open and in the operation of closing.

Similar letters refer to similar parts in both the views.

The object of my present invention is to provide a valve for use with the flushing-tanks of water-closets and similar uses which shall cause a definite and uniform flow of water whenever opened, known as a "sure-supply" valve; and I accomplish this purpose by means of the device represented in the accompanying drawings, in which—

A denotes a portion of a flushing-tank filled to the high-water line with water supplied by means of any self-regulative device known for the purpose—such as an ordinary ball-cock valve—by which the water-supply is cut off whenever the tank is filled. Such valve I have not herein described or illustrated in the drawings, as it forms no part of my invention and its construction and use are well understood. In the bottom of the tank A is an opening B, communicating with the closet through a connecting flushing-pipe in the usual manner. Water is admitted to the flushing-pipe through the opening C, which is closed by the valve-disk C', connected with the lever D, which is pivoted at D' to the arm $D^2$, projecting from the cylinder E.

E denotes a cylinder closed at the upper end by a cap E', provided with a valve $E^2$, opening into the cylinder to admit water to flow into the cylinder, but closing to prevent the escape of water from the cylinder. The cylinder E is supported by the horizontal portion of pipe F, with which the stand-pipe G communicates, and serves as an overflow-pipe to allow the surplus water to escape in case the ball-cock valve fails to close the water-supply. The cylinder E has a series of holes at its lower end, through which water flows freely into or out of the cylinder E, and within the cylinder E is a piston H, provided, preferably, with a flexible disk $a$, in order to furnish a packing against the side of the cylinder. The piston H is attached to a piston rod or stem H', connected with the slotted end of the lever D, to which a chain $b$ is connected, allowing the valve C' to be raised by the attendant in the usual manner. The cap E' is also provided with a small hole $c$, which is partially closed by a sliding plate $d$, provided with a slot and held upon the upper surface of the cap E' by a thumb-screw or any other means. The object of the sliding plate is to allow the size of the hole $c$ to be varied in order to offer a greater or less resistance to the flow of water from the cylinder E. As the valve-disk C' and piston-rod H' are both connected at opposite ends to the pivoted lever D, the angular motion of the lever D will impart a simultaneous movement in opposite directions to the valve-disk C' and piston H', moving the piston downward in the cylinder E as the valve-disk C' is raised to allow a flow of water through the opening B into the flushing-pipe. The valve-disk C' and the long arm of the lever D are made heavy enough to more than counterbalance the short arm of the lever and its connected parts, so the valve-disk C' will fall by its own gravity and close the opening C when the chain $b$ is released. As the valve-disk C' is raised the piston H is moved downward within the cylinder E into the position shown in Fig. 2 of the drawings, forcing the water in the cylinder through the holes $E^3$, and when the valve C' is released and allowed to fall by its own weight the movement of the piston is reversed, closing the valve $E^2$ and forcing the water contained in the cylinder through the small opening $c$, thereby retarding the upward movement of the piston and causing the valve C' to close slowly, permitting the flushing-stream to continue for a longer period, which is determined by the size of the opening $c$.

I am aware that the closing of a flushing-valve has been heretofore retarded by the movement of a piston through a cylinder containing water, which the piston forced through a restricted opened, and I do not herein claim such, broadly; but What I do claim, and desire to secure by Letters Patent, is—

The combination, with a flushing-tank, of the horizontal pipe F, provided at its central section with the exit-opening B and at one end an inlet-opening C and at the opposite end a stand-pipe G, extending vertically above the high-water line, a cylinder E, resting upon said horizontal pipe and communicating with the tank at its lower end, an inlet-valve $E^2$ and a restricted outlet-opening $c$, placed at the upper end of said cylinder, an arm $D^2$, projecting from the side of the cylinder H, and a bent lever D, pivoted in said arm, a valve-disk C', attached at one arm of said lever and arranged to close the opening C by gravity, a piston H, inclosed in the cylinder E, and piston-stem H', connected with the opposite end of said lever, substantially as described.

Dated at Worcester, county of Worcester, State of Massachusetts, this 13th day of November, 1889.

WILLIAM A. TURNER.

Witnesses:
E. CONVERSE,
RUFUS B. FOWLER.